United States Patent [19]

Crossland et al.

[11] Patent Number: 4,653,857
[45] Date of Patent: Mar. 31, 1987

[54] DYNAMIC HOLOGRAM RECORDING

[75] Inventors: William A. Crossland, Harlow; Peter W. Ross, Stanstead; Neil Collings, Sawbridgeworth, all of England

[73] Assignee: Standard Telephones and Cables, PLC, London, England

[21] Appl. No.: 896,349

[22] Filed: Aug. 14, 1986

Related U.S. Application Data

[62] Division of Ser. No. 697,208, Feb. 1, 1985, abandoned.

[30] Foreign Application Priority Data

Feb. 7, 1984 [GB] United Kingdom ................. 8403228

[51] Int. Cl.⁴ ........................... G02F 1/13; G03H 1/04
[52] U.S. Cl. ..................................... 350/320; 350/3.61; 350/351
[58] Field of Search ................... 350/3.64, 347 U, 348, 350/349, 331 T, 351, 320, 351, 3.61

[56] References Cited

U.S. PATENT DOCUMENTS

| 4,145,114 | 3/1979 | Coates et al. | 350/349 |
| 4,461,715 | 7/1984 | Lu et al. | 350/351 |
| 4,606,613 | 8/1986 | Urabe | 350/351 |

OTHER PUBLICATIONS

Stockman, H. E., "Seeing in the Dark is Aim of V-F Holography" *Electronics Nov. 24, 1969, pp. 110–114.*
Powers, J. V., "Thermally Activated Liquid Crystal Display" IBM Tech Disclosure Bulletin, vol. 15, No. 6, p. 1811, 11/1972.
Intlekofer et al, "Display of HF Acoustic Holograms Utilizing Liquid Crystals" Conference: Proceedings of the Society of Photo-Optical Instrumentation Engineers Seminar on Imaging Techniques for Testing and Inspection, Los Angeles, CA Feb. 1972, pp. 83–88.

*Primary Examiner*—Bruce Y. Arnold
*Attorney, Agent, or Firm*—Dennis P. Clarke

[57] ABSTRACT

Optical four wave mixing is provided by interfering two waves on a liquid crystal layer (1) temperature stabilized just beneath its nematic/isotropic phase change transition temperature. The liquid crystal incorporates a guest dye to absorb the light producing a holographic thermal image which is accompanied by a holographic phase image. Illumination of this phase image with a 'third wave' of different wavelength is then used to produce the required holographically diffracted 'fourth wave'.

2 Claims, 1 Drawing Figure

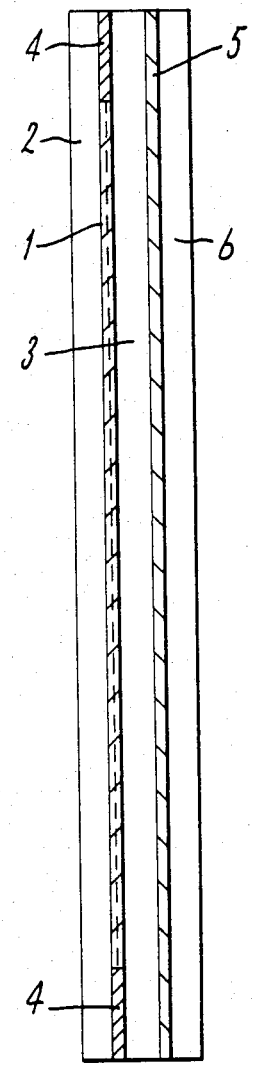

DYNAMIC HOLOGRAM RECORDING

BACKGROUND OF THE INVENTION

This is a division of application Ser. No. 697,208, filed Feb. 1, 1985, now abandoned.

This invention relates to dynamic hologram recording. A dynamic hologram recording device is a kind of optical four-wave mixer. In its 'recording' mode two optical waves are caused to interfere in the device so as to produce a modification of its optical properties and form a (temporary) holographic record of the interference pattern. In its 'playback' mode a third wave, not necessarily of the same frequency, is arranged to be incident upon the device where it interacts with the recorded hologram to produce a diffracted fourth wave.

One example of a four wave mixer is provided by the bismuth silicon oxide mixer in which the recording is effected electronically insofar as the recording results from the local trapping of photo carriers in the crystal medium. The present invention is concerned with a mixer in which the recording results from thermal effects.

SUMMARY OF THE INVENTION

The invention resides in a method of providing optical four wave mixing, wherein a liquid crystal layer incorporating a guest pleochroic dye is thermally stabilised to a predetermined temperature not more than one degree Celsius beneath its nematic/isotropic phase change transition temperature, wherein two waves of a first wavelength at which the dye is selectively absorbing are interfered in the layer to produce a thermal hologram and concomitant phase hologram, and wherein a third wave of a second wavelength, different from the first, at which the dye is substantially transparent is employed to illuminate the layer where it interacts with the phase hologram to produce a holographically diffracted fourth wave.

Operation of the device relies upon the fact that the refractive index of a homogeneously aligned, liquid crystal for light polarised in the plane of the molecular alignment direction is typically a relatively strong function of temperature in the temperature range immediately beneath the nematic/isotropic phase change temperature. In certain instances, particularly where the liquid crystal incorporates a chiral component and/or the alignment directions at the two major surfaces of the liquid crystal are inclined at an angle to each other, this effect may be augmented by the effects of the temperature dependence of tilt angle for molecular alignment systems producing non-zero tilt angles.

BRIEF DESCRIPTION OF THE DRAWING

An embodiment of the invention will now be described with reference to the accompanying drawing which depicts a schematic cross-section of the device.

DETAILED DESCRIPTION OF THE PREFERRED EMBODIMENT

The heart of the device is provided by a thin layer 1 of liquid crystal. This may for instance be 4-cyano-4'-N-hexylbiphenyl. In order to minimise thermal mass this should be made as thin as conveniently possible, typically being in the range 1 to 10 microns in thickness. The layer is confined by front and rear sheets 2 and 3 and an edge seal 4. Considerations of low thermal mass, and the need to minimise thermal spreading, also dictate that the front and rear sheets should be as thin as possible. In the case of a liquid crystal layer 6 microns thick, and 10 cm in diameter, the front and rear sheets may be provided by polyester sheets respectively 3 and 10 microns thick. (A thicker sheet is used in this instance for one of the confining surfaces to give the structure improved mechanical properties. Alternatively the thicker sheet may be replaced by a cellular structure of thin windows of silica or silicon nitride set in a thicker supporting honeycomb matrix of silicon. Such a device can be made in an extremely thin and light form by semiconductor processing of a single crystal silicon wafer.

The liquid crystal layer is to respond to incident light of a first wavelength so as to form a thermal image of the intensity distribution of that light. The light is pulsed coherent light, which may for instance be from a ruby laser. The liquid crystal layer therefore incorporates a pleochroic guest dye with an absorption band matched with this wavelength in order to provide efficient absorption of the incident radiation. This dye is required to be substantially transparent at a second wavelength at which the layer is interrogated with light of a different colour in order to generate the 'fourth wave'.

The whole assembly is placed in a thermostatted enclosure (not shown). A preferred method for fine scale temperature stabilisation utilises the selective reflection properties of a thermochromic cholesteric layer. One face of the rear sheet 3 is covered with a coating 5, which selectively absorbs at a third wavelength, and with a thermochromic cholesteric film 6. The properties of this film 6, the absorption peak of the coating 5, and the wavelength of a monochromatic source (not shown) of circularly polarised light are all matched so that this (third wavelength) light is incident upon the coating 5 through the film 6. The absorption of this light by the coating therefore provides a heating effect which is transferred by conduction to the cholesteric film 6. This film has a pitch which is a very sensitive function of temperature, and is arranged so that, as the film and coating are heated by the incident light, so the pitch expands towards a value matching the wavelength of the incident light in the film. The handedness of the cholesteric is matched with that of the polarisation of the light, and, as a result, a progressive rise in temperature produces a progressive rise in reflectivity of the cholesteric film 6, and hence a progressive reduction in the heating of the absorbing coating 5. The result is that the temperature tends to stabilise at an equilibrium value. It is to be noted however, that this is a state of metastable equilibrium only since an overshoot will tend to lead to runaway heating as, with higher temperatures, the coating 5 once again begins to receive the full radiation. The limits to stability and the accuracy of stabilisation can be estimated by considering the bandwidth and sensitivity of the reflected wavelengths. Selective reflection by a cholesteric film is not strictly monochromatic, but has a finite bandwidth related to the principal refractive indices and given for planar samples by the expression.

$$\text{Bandwidth} = 2(n_o - n_e)/(n_o + n_e).$$

For typical cholesteric mixtures the bandwidth is about one tenth of the reflected wavelength, and thus is about 50 nm for wavelengths in the near infra-red. Narrow band pass filters or coherent sources are available with much narrower bandwidths, and hence it is not difficult to provide a narrow region of equilibrium using a level of illumination that ensures that the equilibrium point is reached before the peak reflection wavelength, so that further heating of the film produces greater reflection, and hence stability of operation. Sensitive cholesterics move their reflection wavelength through the entire visible spectrum in about 0.5° C., providing a mean reflection wavelength coefficient of about 800 nm°C.$^{-1}$, and therefore with a monochromatic source stabilised to ±5 nm, the line width of a typical interference filter, the temperature stabilisation is of the order of ±0.005° C. In practice the coefficient characterising the rate of change with temperature of the wavelength peak reflection is itself a function of temperature, and hence improved stability can be achieved by choosing to operate at a frequency at which the coefficient is at or near a maximum. For low thermal mass the thickness of the cholesteric film 6 should be minimised, but a competing consideration is the need to provide high reflectivity, which increases with film thickness. Reflectivity depends upon the birefringence of the cholesteric and typically it is found that a 90% reflectance level is reached with film thicknesses in the range 10 to 25 microns.

The device is operated cyclically with three distinct periods comprising (1) temperature stabilisation, (2) exposure and development of the holographic image, and (3) illuminated of the hologram with the 'third wave' so as to produce the requisite 'fourth wave'. In the first period the device is illuminated with light of the third wavelength only until the liquid crystal layer has achieved a sufficiently uniform temperature. In the second period the illumination with light of the third wavelength is replaced by illumination with the 'first and second waves' of the first wavelength which interfere to produce the requisite holographic image. This second period is necessarily short to limit the loss of resolution resulting from thermal spreading effects and is for the same reason rapidly followed by the third period which is similarly required to be of short duration.

One particular application of the present invention is in the recording of holograms in the Joint Transform Correlator described in U.S. patent application Ser. No. 697,207 filed 2/1/85 claiming priority from U.K. patent application No. 8403227 and identified as N. Collings, to which attention is directed.

We claim:

1. A method of providing optical four wave mixing, wherein a liquid crystal layer incorporating a guest pleochroic dye is thermally stabilised to a predetermined temperature not more than one degree Celsius beneath its nematic/isotropic phase change transition temperature, wherein two waves of a first wavelength at which the dye is selectively absorbing are interfered in the layer to produce a thermal hologram and concomitant phase hologram, and wherein a third wave of a second wavelength, different from the first, at which the dye is substantially transparent is employed to illuminate the layer where it interacts with the phase hologram to produce a holographically diffracted fourth wave.

2. A method as claimed in claim 1, wherein the thermal stabilisation is achieved at least in part by illuminating with monochromatic light a selectively absorbing coating adjacent the liquid crystal layer through a thermochromic cholesteric film adjacent the coating.

* * * * *